United States Patent
Herz et al.

(10) Patent No.: US 7,434,865 B2
(45) Date of Patent: Oct. 14, 2008

(54) SOFT TOP VEHICLE ROOF HAVING CONVERTIBLE TOP COVER WITH WINDOW PANE

(75) Inventors: Konrad Herz, Weissach (DE); Guenter Kretzmer, Neu-Wulmstorf (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 22 days.

(21) Appl. No.: 11/753,172

(22) Filed: May 24, 2007

(65) Prior Publication Data

US 2007/0284911 A1    Dec. 13, 2007

(30) Foreign Application Priority Data

Jun. 8, 2006    (DE) .................. 10 2006 026 581

(51) Int. Cl.
*B60J 7/00*    (2006.01)

(52) U.S. Cl. .................. 296/107.07; 296/146.14

(58) Field of Classification Search .......... 296/107.07, 296/102, 136.11, 146.14, 121, 107.09, 138, 296/145

See application file for complete search history.

(56) References Cited

U.S. PATENT DOCUMENTS

| | | | | |
|---|---|---|---|---|
| 4,611,849 A | * | 9/1986 | Trenkler | ................. 296/107.07 |
| 5,040,844 A | * | 8/1991 | Stolz et al. | ............. 296/107.07 |
| 5,267,771 A | | 12/1993 | Rothe | |
| 5,454,615 A | * | 10/1995 | Schnepf | ................. 296/146.14 |
| 5,460,424 A | * | 10/1995 | Wagner | ................. 296/107.07 |
| 5,464,265 A | * | 11/1995 | Hemmis et al. | ........ 296/146.14 |
| 5,558,390 A | * | 9/1996 | Hemmis et al. | ........ 296/146.14 |
| 6,082,807 A | | 7/2000 | Hartmann et al. | |
| 6,086,695 A | * | 7/2000 | Kreye | .................... 296/146.15 |
| 6,170,901 B1 | * | 1/2001 | Hartmann et al. | ...... 296/100.07 |
| 6,464,285 B1 | * | 10/2002 | Schutt | .................... 296/107.07 |
| 6,471,283 B2 | * | 10/2002 | Windpassinger et al. ............................ 296/107.07 | |
| 2004/0046413 A1 | * | 3/2004 | Willard | ................. 296/107.07 |

FOREIGN PATENT DOCUMENTS

| | | |
|---|---|---|
| DE | 197 24 592 C1 | 10/1998 |
| DE | 200 08 096 U1 | 6/2001 |
| DE | 101 06 738 C2 | 9/2002 |
| EP | 0 502 320 B1 | 9/1992 |

* cited by examiner

*Primary Examiner*—Kiran B. Patel
(74) *Attorney, Agent, or Firm*—Brooks Kushman P.C.

(57) ABSTRACT

A soft top roof for a vehicle includes a top cover with a window pane. A fastening section borders at least part of the window pane. A clamping part clamps the top cover to the fastening section in order to connect the top cover and the window pane. The clamping part has a hollow space into which a portion of the top cover projects. A casting mass within the hollow space holds the portion of the top cover projecting into the hollow space such that the casting mass fixes the top cover to the fastening section and thereby connects the top cover to the window pane by material bonding.

20 Claims, 3 Drawing Sheets

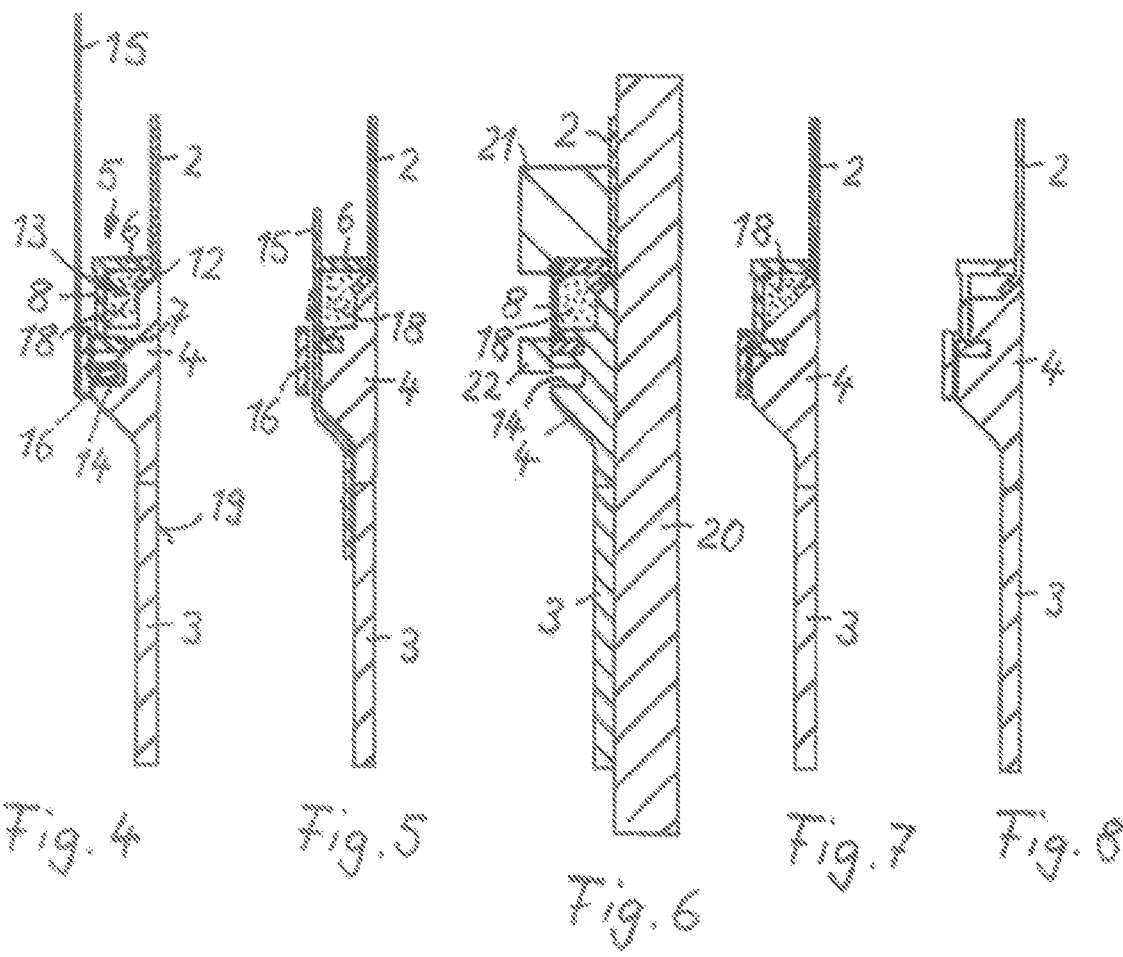

SOFT TOP VEHICLE ROOF HAVING CONVERTIBLE TOP COVER WITH WINDOW PANE

CROSS-REFERENCE TO RELATED APPLICATIONS

This application claims foreign priority benefits under 35 U.S.C. §119(a)-(d) to DE 10 2006 026 581.5, filed Jun. 8, 2006, which is hereby incorporated by reference in its entirety.

BACKGROUND OF THE INVENTION

1. Field of the Invention

The present invention relates to soft top convertible vehicle roofs.

2. Background Art

DE 101 06 738 C2 describes a soft top vehicle roof having a convertible top cover with a rear plastic window pane. A frame assembly movably connects the top cover to the vehicle such that the top cover is movable between a closed position in which the top cover covers the vehicle interior and an opened position in which the top cover exposes the vehicle interior. A fastening section including a clamping frame having locker apertures borders the window pane. The window pane has hooks formed complementary to the locking apertures to hold the clamping frame to the window pane in a form-fit manner. The top cover is held with friction between the window pane and the clamping frame. A problem is that the transition between the top cover and the window pane has an edge which impairs visual appearance and can lead to local peaks in the force applied to the top cover.

SUMMARY OF THE INVENTION

An object of the present invention includes a soft top vehicle roof having a convertible top cover with a rear window pane in which the top cover and the window pane are connected in such a way as to achieve an appealing visual appearance while placing relatively low stress on the top cover.

Another object of the present invention includes a method of forming a soft top vehicle roof having a convertible top cover with a rear window in which the top cover and the window pane are connected in such a way as to achieve an appealing visual appearance while placing relatively low stress on the top cover.

In carrying out the above objects and other objects, an embodiment of the present invention provides a soft top roof for a vehicle. The roof includes a top cover with a window pane. A fastening section borders at least part of the window pane. A clamping part clamps the top cover to the fastening section in order to connect the top cover and the window pane. The clamping part has a hollow space into which a portion of the top cover projects. A casting mass within the hollow space holds the portion of the top cover projecting into the hollow space such that the casting mass fixes the top cover to the fastening section and thereby connects the top cover to the window pane by material bonding.

Further, in carrying out the above objects and other objects, an embodiment of the present invention provides a method of connecting a top cover and a window pane of a soft top roof for a vehicle. The method includes clamping the top cover to a fastening section of the window pane using a clamping part having a hollow space such that a section of the top cover projects into the hollow space of the clamping part. The method further includes placing a casting mass into the hollow space of the clamping part such that the projecting part of the top cover is casted in the casting mass with the top cover and the casting mass being connected together by material bonding.

In an embodiment of the present invention, the clamping frame for fastening the top cover to the edge fastening section of the window pane has a hollow space. A portion of the clamped-in top cover projects into the hollow space of the clamping frame. A casting mass is placed in the hollow space. The casting mass holds the edge section of the top cover projecting into the hollow space such that the top cover is fixed by the casting mass to the fastening section of the window pane. This connects the top cover to the window pane by material bonding which thereby increases safety from undesired loosening, either partial or total, of the top cover especially over long periods of time.

If needed, the clamping frame can be loosened after the casting mass is cast. In this case, only the material bonding between the casting mass and the top cover connects the casting mass and the top cover or assumes the transfer of forces. In this embodiment, the clamping frame only holds the top cover prior to the casting of the casting mass and the formation of the casting area. In another embodiment, the casting mass also holds the clamping frame to the fastening section of the window pane.

A method of connecting the top cover and the window pane in accordance with an embodiment of the present invention includes fastening the top cover to the fastening section by the clamping frame, which forms a hollow space into which a section of the top cover projects. Subsequently, a casting mass is placed into the hollow space of the clamping frame which casts the projecting part of the top cover in the casting mass and connects the casting mass and the top cover by material bonding. In an embodiment of the present invention, the casting mass is placed into the hollow space using an injection molding technique and the window pane is an injection molded component. The casting mass and the window pane may be formed of the same material such as a thermoplastic material like polycarbonate or polyurethane. The method may further include making a groove in the fastening section of the window pane. During assembly, the clamping frame is inserted into the groove which fastens the top cover in the direction of pull. This is followed by placing the casting mass into the hollow space formed in the clamping frame.

In an embodiment of the present invention, the clamping frame is in the form of a U-shaped frame having two side limbs. The side limbs are spaced apart from one another and are connected together through a plurality of spaced apart struts. A first one of the limbs lies on the top cover and clamps down on the top cover. The struts connecting the limbs have recesses between them through which the casting mass can be cast in the hollow space between the limbs. The height of the struts can be slightly lowered such that the struts are covered by the casting mass after the casting mass is placed in the hollow space in order to achieve a visually appearing appearance.

A second one of the limbs projects into the groove in the fastening section and the first one of the limbs clamps the top cover and ends flush with the outside edge of the fastening section of the window pane. This embodiment meets requirements for a solid connection between the top cover and the window pane with an advantageous design.

In an embodiment of the present invention, the fastening section of the window pane has ribs on it to hold the top cover in place temporarily. The top cover may have recesses with a complementary shape to the ribs to lay the top cover around the ribs and possibly to button the top cover in to thereby prevent inadvertent slipping and displacement of the top cover during assembly.

In an embodiment of the present invention, the clamping frame is located on the inside of the window pane to which the interior ceiling of the vehicle roof is also fastened. To fasten the interior ceiling, it is advantageous for the fastening section to have depressions into which the interior ceiling is pressed using clips.

The above features, and other features and advantages of the present invention as readily apparent from the following detailed descriptions thereof when taken in connection with the accompanying drawings.

BRIEF DESCRIPTION OF THE DRAWINGS

FIG. 2 illustrates a perspective view of a transitional area between the top cover and the window pane;

FIG. 3 illustrates a top view of the transitional area between the top cover and the window pane;

FIG. 4 illustrates a cross-sectional side view of the roof along the line IV-IV of FIG. 3;

FIG. 5 illustrates a cross-sectional side view of the roof along the line V-V of FIG. 3;

FIG. 6 illustrates a cross-sectional side view of the roof along the line VI-VI of FIG. 3 shown with an additional tooling assembly for connecting the top cover and the window pane;

FIG. 7 illustrates a cross-sectional side view of the roof along the line VII-VII of FIG. 3; and FIG. 8 illustrates a cross-sectional side view of the roof along the line VIII-VIII of FIG. 3.

DETAILED DESCRIPTION OF THE PREFERRED EMBODIMENT(S)

Figure 1:
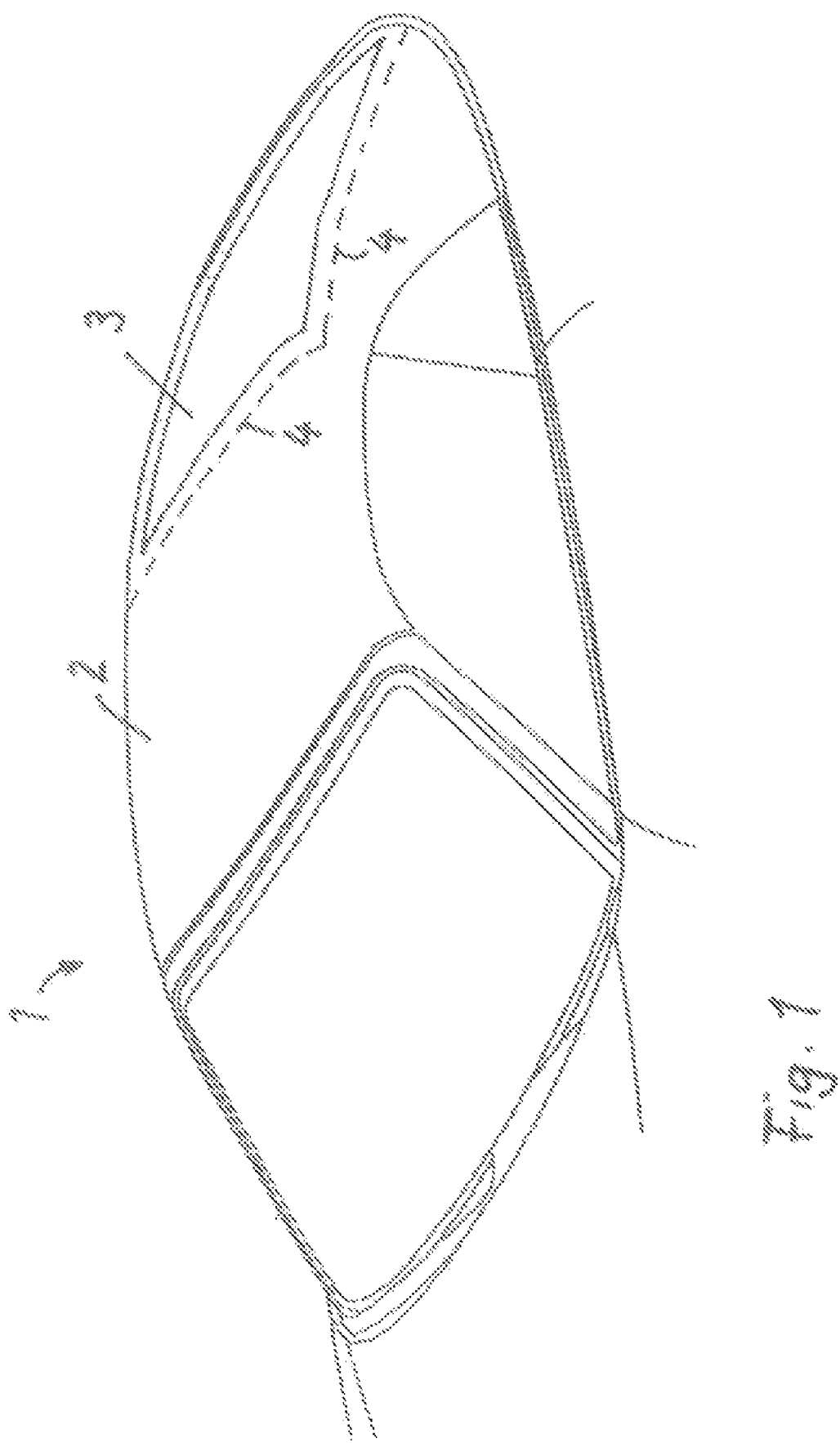
FIG. 1 illustrates a perspective view of a soft top vehicle roof having a convertible top cover with a rear window pane in which the top cover is movable between a closed position in which the top cover covers the vehicle interior and an opened position in which the top cover exposes the vehicle interior in accordance with an embodiment of the present invention with the top cover being in the closed position.

Identical components have the same reference numerals in the figures.

Referring now to FIG. 1, a perspective view of a soft top roof 1 having a flexible convertible top cover (cloth) 2 with a rear window pane 3 for a vehicle in accordance with an embodiment of the present invention is shown. A frame assembly (not shown) movably connects top cover 2 to the vehicle body such that top cover 2 (with window pane 3) is movable between a closed position in which top cover 2 (with window pane 3) covers the vehicle interior and an opened position in which top cover 2 (with window pane 3) exposes the vehicle interior. FIG. 1 illustrates roof 1 in the closed position.

Window pane 3 forms part of rear section of roof 1 such that window pane is integrated into top cover 2. Top cover 2 surrounds window pane 3 and is flush with window pane 3.

A fastening section 4 connects top cover 2 and window pane 3. Fastening section 4 represents the edge section of window pane 3. Fastening section 4 is made as a single part with window pane 3. In an embodiment, fastening section 4 forms a border all around window pane 3. In another embodiment, fastening section 4 is U-shaped such that fastening section 4 borders window pane 3 with the exception of bordering the side of window pane 3 facing the rear of the vehicle if there is no other portion of top cover 2 between that side of window pane 3 and the rear of the vehicle.

Figures 2, 3:
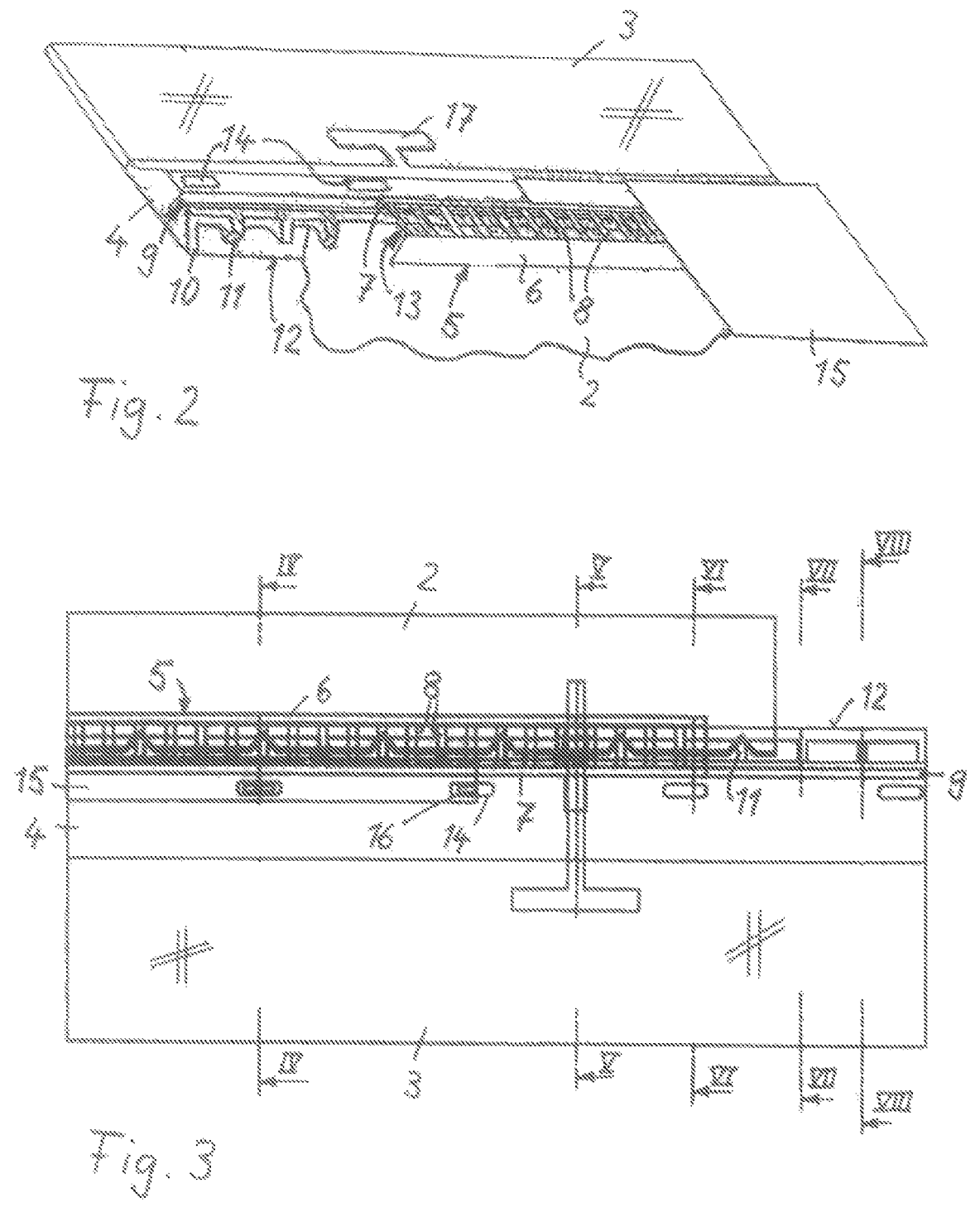

Referring now to FIG. 2, with continual reference to FIG. 1, perspective and top views, respectively, of a transitional area between top cover 2 and window pane 3 are shown. Each of FIGS. 2 and 3 shows the bottom sides of top cover 2 and window pane 3 (i.e., the sides of top cover 2 and window pane 3 which face the vehicle interior when roof 1 is in the closed position).

As shown in FIGS. 2 and 3, fastening section 4 directly adjoins window pane 3 and forms a component that is a single piece with window pane 3. In an embodiment, window pane 3 and fastening section 4 are made from thermoplastic materials, such as polycarbonate, using injection molding. In an embodiment, window pane 3 and/or fastening section 4 is tinted.

Fastening section 4 includes a groove 9 running parallel to the edge of window pane 3 and a side edge 12 of fastening section 4. A clamping part in the form of a clamping frame 5 inserts into groove 9. Clamping frame 5 has the same type of cross-section shape as fastening element (e.g., a U-shaped cross-section) such that clamping frame 5 extends essentially over the length of fastening section 4.

Clamping frame 5 includes first and second side limbs 6, 7. Side limbs 6, 7 run parallel to one another and are spaced apart from one another. Struts 8 connect side limbs 6, 7 with one another at the base of the "U" of clamping frame 5. In this embodiment, struts 8 are spaced apart from one another such that a recess is formed between each pair of neighboring struts. Side limbs 6, 7 and struts 8 border a hollow space 13. Second Limb 7 of clamping frame 5, which faces window pane 3, is inserted into groove 9 of fastening section 4.

First limb 6 of clamping frame 5, which faces away from window pane 3, clamps top cover 2. First limb 6 clamps top cover 2 by pressing top cover 2, which lies beneath first limb 6, against side edge 12 of fastening section 4. Top cover 2 passes under first limb 6 and projects into hollow space 13, which is bordered by clamping frame 5.

Fastening section 4 includes ribs 10, 11 on the side facing side edge 12 of fastening section 4. Ribs 10, 11 run in the direction toward side edge 12 and are spaced apart from one another. Ribs 10 drop off at an angle and end with side edge 12. Ribs 11 drop off vertically and serve to fix top cover 2. This is done by having recesses in top cover 2 surround ribs 11 as shown in FIG. 3.

Fastening section 4 includes depressions 14. Depressions 14 serve to fasten an interior ceiling 15. Clips 16 fix interior ceiling 15 to depressions 14. Depressions 14 are spaced at regular intervals between window pane 3 and groove 9 of fastening section 4. Depressions 14 extend parallel to side edge 12 of fastening section 4.

An electrical connection 17 is put on window pane 3 to heat window pane 3.

Referring now to FIGS. 4, 5, 6, 7, and 8, with continual reference to FIGS. 1, 2, and 3, various cross-sectional side views of roof 1 are shown. Clamping frame 5 borders hollow space 13. A casting mass 18 is placed into hollow space 13 to fix the portion of top cover 2 projecting into hollow space to fastening section 4. Casting mass 18 is injection molded into hollow space 13. Casting mass 18 may include the same material as the material of window pane 3 and/or fastening section 4. After casting mass 18 is placed into hollow space 13 and hardens within hollow space 13, the edge section of top cover 2 is located in the middle of casting mass 18 such that a material bond is created between top cover 2 and casting mass 18. This holds top cover 2 to fastening section 4 and window pane 3 such that top cover 2 cannot come loose.

As shown in the cross-sectional side views of FIGS. 4, 5, 6, 7, and 8, the transition between top cover 2 and fastening section 4 is flush on the outside 19. That is, there is no step or gap in the transition from fastening section 4 to top cover 2.

First limb 6 of clamping frame 5, which is located on the side of clamping frame 5 facing away from window pane 3 (and facing toward top cover 2), lies in a plane extending perpendicular to the plane of window pane 3. In this plane, first limb 6 ends with side edge 12 of fastening section 4. In the area of this side edge 12, an edge section of top cover 2 is guided along the sloping bevel of side edge 12 inward into hollow space 13. This edge section of top cover 2 is held in hollow space 13 by casting mass 18.

As shown in FIG. 6, top cover 2 and fastening section 4 are fastened together during casting with the use of suitable tools 21, 22. A shaped support 20 lies on the outside of window pane 3. Tools 21, 22 press window pane 3, together with the mounted clamping frame 5, against shaped support 20. This makes top cover 2 end cleanly with side edge 12 of fastening section 4.

LIST OF REFERENCE NUMBERS

1 Soft top vehicle roof
2 Convertible top cover
3 Rear window pane
4 Fastening section
5 Clamping frame
6 First limb
7 Second limb
8 Struts
9 Groove
10 Ribs
11 Ribs
12 Side edge
13 Hollow space
14 Depression
15 Interior ceiling
16 Clips
17 Electrical connection
18 Casting mass
19 Outside edge
20 Shaped support
21 Tool
22 Tool While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A soft top roof for a vehicle, the roof comprising:
a top cover;
a window pane;
a fastening section bordering at least part of the window pane; and
a clamping part clamping the top cover to the fastening section in order to connect the top cover and the window pane, wherein the clamping part has a hollow space into which a portion of the top cover projects, wherein a casting mass within the hollow space holds the portion of the top cover projecting into the hollow space such that the casting mass fixes the top cover to the fastening section and thereby connects the top cover to the window pane by material bonding.

2. The roof claim 1 wherein:
the window pane is an injection molded component.

3. The roof of claim 1 wherein:
the window pane and the casting mass include the same materials.

4. The roof of claim 1 wherein:
at least one of the window pane and the casting mass includes a thermoplastic material.

5. The roof of claim 4 wherein:
the thermoplastic material is polycarbonate.

6. The roof of claim 1 wherein:
at least one of the window pane and the casting mass includes polyurethane.

7. The roof of claim 1 wherein:
the fastening section has a groove, wherein the clamping part engages the groove to connect to the window pane.

8. The roof of claim 7 wherein:
the clamping part includes a U-shaped clamping frame having first and second side limbs, wherein the side limbs are spaced apart from one another and are connected together through a plurality of spaced apart struts, wherein the first limb lies on the top cover and clamps down on the top cover.

9. The roof of claim 8 wherein:
the second limb projects into the groove of the fastening section to connect the clamping frame to the window pane.

10. The roof of claim 9 wherein:
the first limb ends flush with an outside edge of the fastening section.

11. The roof of claim 8 wherein:
the struts have recesses between them through which the casting mass can be cast in the hollow space between the limbs.

12. The roof of claim 8 wherein:
the height of the struts is adjustable such that the struts are covered by the casting mass after the casting mass is placed in the hollow space in order to achieve a visually appearing appearance.

13. The roof of claim 1 wherein:
the fastening section includes depressions for connection to an interior ceiling.

14. The roof of claim 1 wherein:
the window pane and the fastening section are a unitary part.

15. The roof of claim 1 wherein:
the fastening section includes ribs for fixing to the top cover.

16. A method of connecting a top cover and a window pane of a soft top roof for a vehicle, the method comprising:
clamping the top cover to a fastening section of the window pane using a clamping part having a hollow space such that a section of the top cover projects into the hollow space of the clamping part; and
placing a casting mass into the hollow space of the clamping part such that the projecting part of the top cover is casted in the casting mass with the top cover and the casting mass being connected together by material bonding.

17. The method of claim 16 wherein:
the step of placing the casting mass into the hollow space of the clamping part includes is done by injection molding of the casting mass into the hollow space of the clamping part.

18. The method of claim 16 wherein:
the window pane and the casting mass are formed of the same thermoplastic material.

19. The method of claim 16 further comprising:
inserting the clamping part into a groove of the fastening section of the window pane and then placing the casting mass into the hollow space of the clamping part.

20. The method of claim 16 wherein:
at least one of the window pane and the casting mass includes polyurethane.

* * * * *